(12) United States Patent  (10) Patent No.: US 7,479,992 B2
Miki  (45) Date of Patent: Jan. 20, 2009

(54) IMAGE RECORDING APPARATUS

(75) Inventor: Shigeru Miki, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 733 days.

(21) Appl. No.: 10/733,083

(22) Filed: Dec. 11, 2003

(65) Prior Publication Data

US 2004/0212694 A1  Oct. 28, 2004

(30) Foreign Application Priority Data

Jan. 7, 2003  (JP) .............................. 2003-001259

(51) Int. Cl.
  H04N 5/76  (2006.01)
  H04N 9/64  (2006.01)
  G06F 12/00  (2006.01)
(52) U.S. Cl. .............................. 348/231.1; 348/231.99; 348/231.2; 348/714; 348/716; 711/170; 711/171; 711/172; 711/173
(58) Field of Classification Search .............. 348/231.2, 348/231.99, 231.1, 716, 714
  See application file for complete search history.

(56) References Cited

U.S. PATENT DOCUMENTS

| 5,454,096 | A | * | 9/1995 | Otsuka et al. ................... 711/1 |
| 5,717,496 | A | * | 2/1998 | Satoh et al. .................. 358/402 |
| 6,002,835 | A | * | 12/1999 | Watanabe .................... 386/95 |
| 6,088,391 | A | * | 7/2000 | Auld et al. ............. 375/240.15 |
| 6,496,222 | B1 | * | 12/2002 | Roberts et al. .......... 348/231.99 |
| 6,804,746 | B2 | * | 10/2004 | Duruoz ....................... 711/112 |

FOREIGN PATENT DOCUMENTS

| EP | 0909084 A2 | * | 4/1999 |
| JP | 06-303403 | | 10/1994 |
| JP | 10-124381 | | 5/1998 |
| JP | 3177491 | | 4/1999 |
| JP | 2000-195144 | | 7/2000 |
| JP | 2002-041336 | | 2/2002 |
| JP | 2003-280951 | | 10/2003 |
| JP | 2003-304438 | | 10/2003 |

OTHER PUBLICATIONS

Russel, C.; NTFS vs. FAT: Which is right for you? posted on Oct. 1, 2001 and retrieved on Sep. 17, 2007 from <URL: http://www.microsoft.com/windowsxp/using/setup/expert/russel_october01.mspx>.*

* cited by examiner

*Primary Examiner*—David L Ometz
*Assistant Examiner*—Wanda M Negron
(74) *Attorney, Agent, or Firm*—Gerald T. Bodner

(57) ABSTRACT

An image recording apparatus includes an image sensor. Image data of an object imaged by the image sensor is recorded on a recording medium to which an FAT system is adopted. A recording area of the recording medium is divided into a plurality of clusters, and available clusters can be dispersedly distributed. When formatting the recording medium, a CPU increases a cluster size as a capacity of the recording medium is larger, or the recordable number of frames of the recording medium is greater.

18 Claims, 6 Drawing Sheets

IMAGE RECORDING APPARATUS

BACKGROUND OF THE INVENTION

1. Field of the invention

The present invention relates to an image recording apparatus that is applied to a digital camera, for example. More specifically, the present invention relates to an image recording apparatus that records an image signal on a recording medium having a storing area divided into a plurality of unit areas.

2. Description of the prior art

An example of such kind of a conventional image recording apparatus is disclosed in a Japanese Patent No. 3177491 registered on Apr. 6, 2001. In the prior art, an FAT (File Allocation Table) system is adopted as a file management method of a recording medium. When an unused recording medium is attached to a digital camera, the number of sectors forming one cluster is changed from "4" to "16". Thus, it is possible to shorten a time required to record image data.

However, when a cluster size is increased, efficiency in the use of the recording medium is decreased. The problem of reduction in the efficiency in the use of the recording medium becomes conspicuous as the capacity of the recording medium is small, that is, the number of frames to be recorded on the recording medium, i.e., the recordable number of frames is few. However, in the prior art, the cluster size is changed to "16" regardless of the recording capacity or the recordable number of frames. Thus, in the prior art, it is possible to reduce a time required to record, but it is impossible to prevent the efficiency in the use of the recording medium from being decreased.

SUMMARY OF THE INVENTION

Therefore, it is a primary object of the present invention to provide an image recording apparatus capable of managing to shorten a time required to record and prevent efficiency in the use of a recording medium from being reduced at the same time.

According to the present invention, an image recording apparatus that records image data on a recording medium in which a recording area is divided into a plurality of unit areas and available unit areas can be dispersedly distributed comprises: a detecting means for detecting a capacity of the recording medium; and a setting means for setting the unit areas to a larger size as the capacity detected by the detecting means is large.

The image data is recorded on the recording medium in which the recording area is divided into the plurality of the unit areas and the available unit areas can be dispersedly distributed. At this time, the detecting means detects the capacity of the recording medium, and the setting means increases the size of the unit area as the detected capacity is large.

When the recording capacity is large, the reduction in the efficiency in the use of the recording medium is insignificant. Thus, the size of the unit area is set to a large value in order to shorten the recording time period. On the other hand, when the recording capacity is small, it is necessary to consider the efficiency in the use of the recording medium as more important than the recording time period, and therefore, the size of the unit area is set to a small value. Thus, it is possible to manage to shorten a time required to record and prevent the efficiency in the use of the recording medium from being reduced at the same time.

Preferably, a specifying means specifies the recordable number of frames of the recording medium on the basis of the capacity detected by the detecting means. A setting means sets the size of the unit areas on the basis of the recordable number of frames specified by the specifying means.

The recordable number of frames depends on the size of the image data, and the size is varied by a factor subsequently generated (for example, resolution of the image sensor, or default compression ratio of the codec). Furthermore, the recordable number of frames is an important element in order to determine which to be considered as more important, the recording time period or the efficiency in the use of the recording medium. Thus, the recordable number of frames is specified on the basis of the capacity of the recording medium, and the size of the unit area is set on the basis of the specified recordable number of frames. Thus, it is possible to most properly manage to shorten a time required to record and prevent the efficiency in the use of the recording medium from being reduced at the same time.

More preferably, the image data is compressed image data compressed by rendering a predetermined size a target, and the specifying means specifies the recordable number of frames on the basis of the capacity of the recording area and the target size. By setting the target size of the compressed image data, it is possible to easily detect the recordable number of frames.

Preferably, the image data is motion image data formed by a plurality of screens of still images, and the setting means sets the size of the unit areas in consideration of a bit rate of the motion image data. Thus, it is possible to prevent the processing from being broken down due to an overflow of a buffer.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
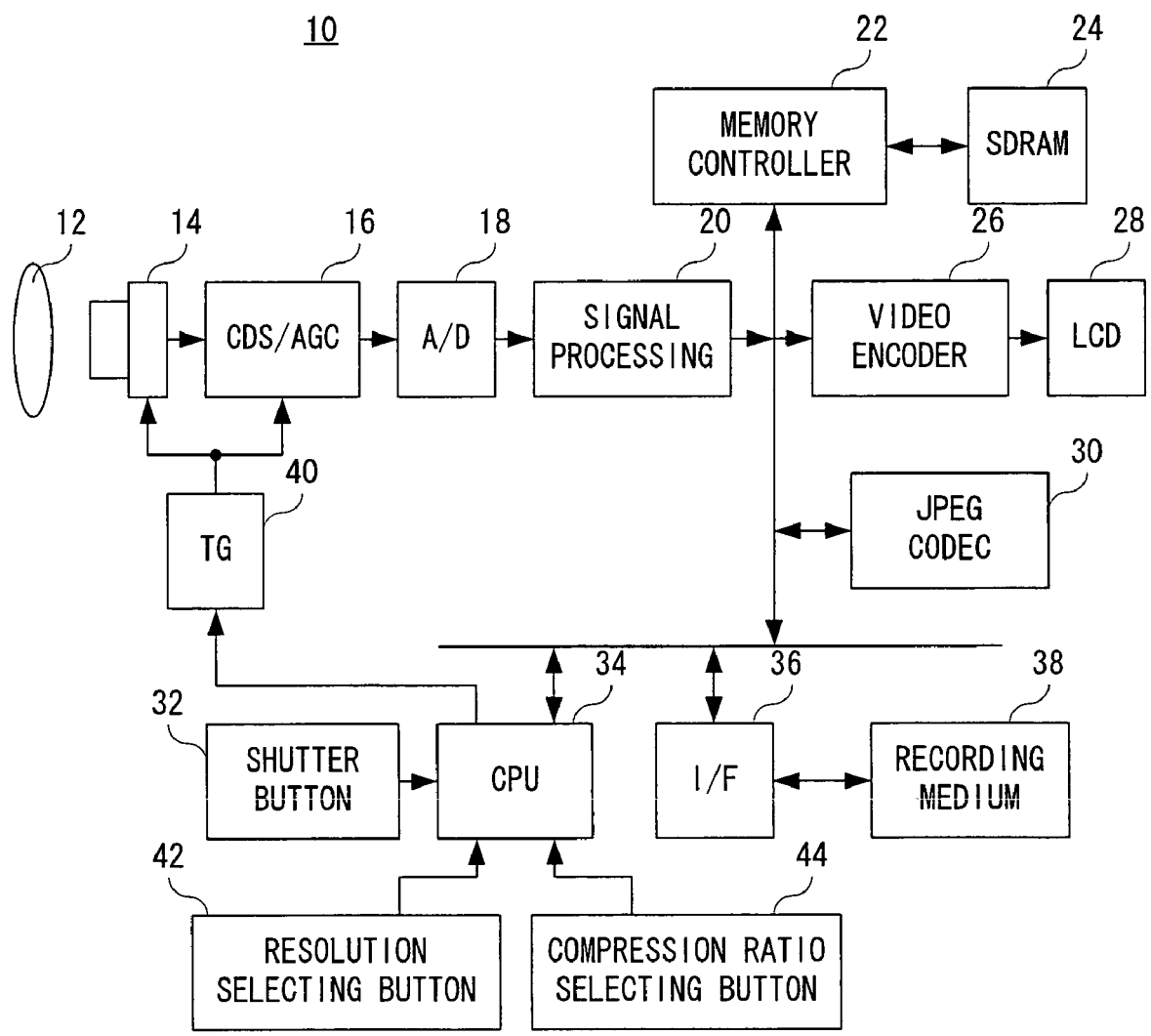
FIG. 1 is an illustrative view showing one embodiment of the present invention.

Referring to FIG. 1, a digital camera of this embodiment includes an optical lens 12. An optical image of an object is incident onto a light-receiving surface of an image sensor 14 such as a CCD imager via the focus lens 12. T he light-receiving surface is covered with a color filter (not shown) having a primary color Bayer array, and an electronic charge, i.e., pixel signal generated in each of light-receiving elements (pixels) formed on the light-receiving surface has color information of only one of R, G and B.

It is noted that although the CCD imager is utilized as the image sensor 14 in this embodiment, using a CMOS imager is appropriate in place thereof.

When a main power source is turned on, a through image displaying process is executed. First, a CPU 34 instructs a TG (Timing Generator) 40 to repeat a thin-out reading. The TG 40 subjects the image sensor 40 to the thin-out reading at a frame rate of 30 fps. Thus, a raw image signal with a resolution reduced in a vertical direction is read from the image sensor 14 in a raster scan manner. The output raw image signal of low resolution has color information of R and G by turns in an even-numbered line, and has color information of G and B by turns in an odd-numbered line.

A CDS/AGC circuit 16 subjects each frame of the raw image signal output from the image sensor 14 to a noise removal and a gain adjustment, and an A/D converter 18 converts the raw image signal having been subjected to such the processing into raw image data of a digital signal. The converted raw image data is applied to a signal processing circuit 20 so as to be subjected to a signal processing such as a white balance adjustment, a color separation, a horizontal thin-out, a YUV conversion, and etc. Then, YUV data obtained by the YUV conversion is written to an SDRAM 24 by a memory controller 22.

A video encoder 26 reads the YUV data of each frame from the SDRAM 24 through the memory controller 22, and converts the read YUV data into a composite video signal in an NTSC format through a reduction zooming process. The converted composite video signal is applied to an LCD 28. Thus, a real time motion image of the object, i.e., through image is output from the LCD 28.

The number of effective pixels of the image sensor 14 is approximately 2 millions, and the number of a horizontal pixels and the number of vertical pixels are "1600" and "1200", respectively. As described later, YUV data corresponding to a still image of the object is subjected to a compression process to be recorded in a recording medium 38. At this time, a compression ratio according to a target file size is set to a JPEG codec 30.

In this embodiment, any one of a first resolution (=1600 pixels ×1200 pixels) and a second resolution (=640 pixels ×480 pixels) is selectable as a resolution of the still image. A plurality of compression ratios are prepared for each resolution.

In the first resolution shooting mode, any one of a first compression ratio (=0), a second compression ratio (=5.2), a third compression ratio (=8.2), and a fourth compression ratio (13.4) is selectable. When the first compression ratio is selected, a still image file having a first file size (=5.76 MB) is created, and when the second compression ratio is selected, a still image file having a second file size (=1.1 MB) is created. Furthermore, when the third compression ratio is selected, a still image file having a third file size (=700 KB) is created, and when the fourth compression ratio is selected, a still image file having a fourth file size (=430 KB) is created.

In the second resolution shooting mode, any one of a fifth compression ratio (=7.7) and a sixth compression ratio (=13.2) is selectable. When the fifth compression ratio is selected, a still image file having a fifth file size (=120 KB) is created, and when the sixth compression ratio is selected, a still image file having a sixth file size (=70 KB) is created.

It is noted that desired resolution and compression ratio are selected by operating a resolution selecting button 42 and a compression ratio selecting button 44.

When a shutter button 32 is operated in a state the shooting mode is selected and the first resolution is selected, the CPU 34 instructs the TG 40 to execute an all pixel reading. The TG 40 subjects the image sensor 14 to the all pixel reading for one frame (one screen) to output a raw image signal of high resolution from the image sensor 14 in a raster scan manner. The output raw image signal has color information of R and G by turns in an even-numbered line, and has color information of G and B by turns in an odd-numbered line.

The raw image signal read in response to an operation of the shutter button 32 is subjected to the above-described processing by the CDS/AGC circuit 16, the A/D converter 18, and the signal processing circuit 20. It is noted that the horizontal thin-out is omitted, and YUV data of high resolution is output from the signal processing circuit 20. The output YUV data is written to the SDRAM 24 via the memory controller 22. The video encoder 26 reads the YUV data of high resolution stored in the SDRAM 24 through the memory controller 22, and converts the read YUV data into a composite video signal in the NTSC format through the reduction zooming. Thus, a still image of the object at a time that the shutter button 32 is operated, i.e., a freeze image is output from the LCD 28.

Furthermore, when any one of the second to fourth compression ratios is selected, the CPU 34 applies a compression instruction to the JPEG codec 30. The compression instruction includes information indicative of the selected compression ratio. The JPEG codec 30 reads the YUV data from the SDRAM 24 through the memory controller 22, subjects the read YUV data to the JPEG compression according to the desired compression ratio, and writes compressed YUV data, i.e., JPEG data to the SDRAM 24 through the memory controller 22. The CPU 34 reads the JPEG data stored in the SDRAM 24 through the memory controller 22, and records a still image file storing the read JPEG data on the recording medium 38 through an I/F 36.

When the first compression ratio (=0) is selected, a compression processing is unnecessary. The CPU 34 reads the YUV data stored in the SDRAM 24 through the memory controller 22, and records the still image file storing the YUV data on the recording medium 38 via the I/F 36.

It is noted that the recording medium 38 is detachable, and is connected to the I/F 36 at a time of attachment. In addition, the recording medium 38 adopts the FAT system as a file management system. A recording area is divided into a plurality of clusters, and available clusters can be dispersedly scattered. The still image file is dispersedly written to the plurality of clusters.

When the second resolution is selected, the CPU 34 instructs the TG 40 to execute a thin-out reading in response to an operation of the shutter button 32. The TG 40 subjects the image sensor 14 to the thin-out reading for one frame period. Thus, a raw image signal of low resolution is output from the image sensor 14 in the raster scan manner. The number of vertical lines of the raw image signal output from the image sensor 14 by the thin-out reading is one fourth of the number of the vertical lines of the raw image signal output from the image sensor 14 by the all pixel reading. It is noted that the output raw image signal has color information of R and G by turns in an even-numbered line, and has color information of G and B by turns in an odd-numbered line.

The raw image signal read in response to the operation of the shutter button 32 is subjected to the above-described processing by the CDS/AGC circuit 16, the A/D converter 18, and the signal processing circuit 20. When the second resolution is selected, a horizontal thin-out processing is executed in the signal processing circuit 20 to reduce the number of horizontal pixels to one fourth. Then, YUV data of low resolution is output from the signal processing circuit 20. The YUV data is written to the SDRAM 24 via the memory controller 22. The YUV data of low resolution stored in the SDRAM 24 is then applied to the video encoder 26 via the memory controller 22 so as to be converted into a composite video signal in the NTSC format through a reduction zooming. Thus, a still image (freeze image) of the object at a time the shutter button 32 is operated is output from the LCD 28.

Furthermore, when the shutter button 32 is operated, the CPU 34 applies a compression instruction to the JPEG codec 30. The compression instruction includes information indicative of any one of the fifth compression ratio and the sixth compression ratio. The JPEG codec 30 reads YUV data of low resolution from the SDRAM 24 through the memory controller 22, subjects the read YUV data to a JPEG compression, and writes JPEG data to the SDRAM 24 via the memory controller 22. The CPU 34 reads the JPEG data stored in the SDRAM 24 through the memory controller 22, and records the read JPEG data on the recording medium 38 through the I/F 36.

When a reproducing mode is selected, filenames of the still image files recorded on the recording medium 38 are displayed on the LCD 28. Herein, when a user selects a desired filename, JPEG data or YUV data stored in the selected still image file is read from the recording medium 38 by the CPU 34. The read JPEG data or YUV data is written to the SDRAM 24 by the memory controller 22.

When the data stored in the SDRAM 24 is the JPEG data, the CPU 34 applies an expansion instruction to the JPEG codec 30. The JPEG codec 30 reads the JPEG data from the SDRAM 24 through the memory controller 22, subjects the read JPEG data to a JPEG expansion, and writes expanded YUV data to the SDRAM 24 through the memory controller 22.

The YUV data stored in the SDRAM 24 is applied to the video encoder 26 via the memory controller 22. The video encoder 26 subjects the applied YUV data to a reduction zooming to convert it into a composite video signal in the NTSC format, and applies the converted composite video signal to the LCD 28. Thus, a reproduced still image is displayed from the LCD 28.

As described above, the recording medium 34 adopts the FAT system, and the still image file is dispersedly managed by the plurality of clusters. Herein, as the size of the cluster is increased, the file is managed with a few clusters. However, if the size of the still image file is decreased, the unused area (sector) is increased, reducing the efficiency in the use of the recording medium 38. On the other hand, as the size of the cluster is decreased, the reduction in the efficiency in the use of the recording medium 38 is reduced, while the number of the clusters required to manage one still image file is greater, taking much time to write to and read from the file.

For example, in a case that the still image file of the third file size (=700 Kbytes) is stored in the recording medium having a capacity of 64 Mbytes, if the size of the cluster is set to 16 Kbytes, the number of the clusters required to store one still image file becomes "44 (=700 Kbytes/16 Kbytes)", and the recordable number of frames becomes "90 (=64 Mbytes/(16 Kbytes*44 clusters)). Furthermore, if the size of the cluster is set to 32 Kbytes, the number of the clusters required to store one still image file becomes "22 (=700 Kbytes/32 Kbytes)", and the recordable number of frames becomes "90 (=64 Mbytes/(32 Kbytes*22 clusters)).

On the other hand, in a case that the still image file of the sixth file size (=70 Kbytes) is stored in the recording medium having a capacity of 64 Mbytes, if the size of the cluster is set to 8 Kbytes, the number of the clusters required to record one still image file becomes "9 (=70 Kbytes/8 Kbytes)", and the picture-takable number of frames becomes "888 (=64 Mbytes/(8 Kbytes*9 clusters)). Furthermore, if the size of the cluster is set to 16 Kbytes, the number of the clusters required to store one still image file becomes "5 (=70 Kbytes/16 Kbytes)", and the picture-takable number of frames becomes "800 (=64 Mbytes/(16 Kbytes*5 clusters)). In addition, if the size of the cluster is set to 32 Kbytes, the number of the clusters required to store one still image file becomes "3 (=70 Kbytes/32 Kbytes)", and the recordable number of frames becomes "666 (=64 Mbytes/(32 Kbytes*3 clusters)).

That is, if the file size is large, the recordable number of frames is not reduced even if the cluster size is increased, and the larger cluster size increases a writing speed. Similarly, if the file size is small, the writing speed does not decrease even if the cluster size is reduced, and the smaller cluster size prevents the recordable number of frames from being decreased.

On the contrary thereto, if the cluster size is made to increase when the file size is small, the writing speed becomes fast while the recordable number of frames may decrease. Furthermore, if the cluster size is made to decrease when the file size is large, decrease in the recordable number of frames is prevented while the writing speed becomes late.

By the way, in practice, if the recordable number of frames, that is, a recording capacity is originally greater, the decrease in the recordable number of frames, that is, the reduction in efficiency in the use of the cluster does not present a large problem.

In view of the above-described characteristics, the recordable number of frames is calculated on the basis of the size of the still image file created in a default imaging condition and the capacity of the recording medium 38, and the recording medium 38 is formatted in the cluster size in correspondence to the calculated recordable number of frames.

More specifically, if the recordable number of frames is equal to or more than a first threshold value (=100), considering the writing speed of the file as the most important, the cluster size is determined to be a first size (=32 Kbytes). That is, if the recordable number of frames is equal to or more than 100, regarding that the reduction in the efficiency in the use of the recording medium 34 is not a large problem, the cluster size is increased. Furthermore, if the recordable number of frames is less than the first threshold value and equal to or more than a second threshold value (=50), considering the writing speed of the file and the efficiency in the use of the recording medium 38 as the most important, the cluster size is determined to be a second size (=16 Kbytes). In addition, if the recordable number of frames is less than the second threshold value, considering the efficiency in the use of the recording medium 38 as more important than the writing speed, the cluster size is determined to be a third size (=8 Kbytes).

That is, as the recordable number of frames is great, the cluster size is determined to be a large value while as the recordable number of frames is small, the cluster size is determined to be a small value. Such the determination of the cluster size depending on the recordable number of frames makes it possible to be used suitably for each of the recording mediums.

Figure 2:
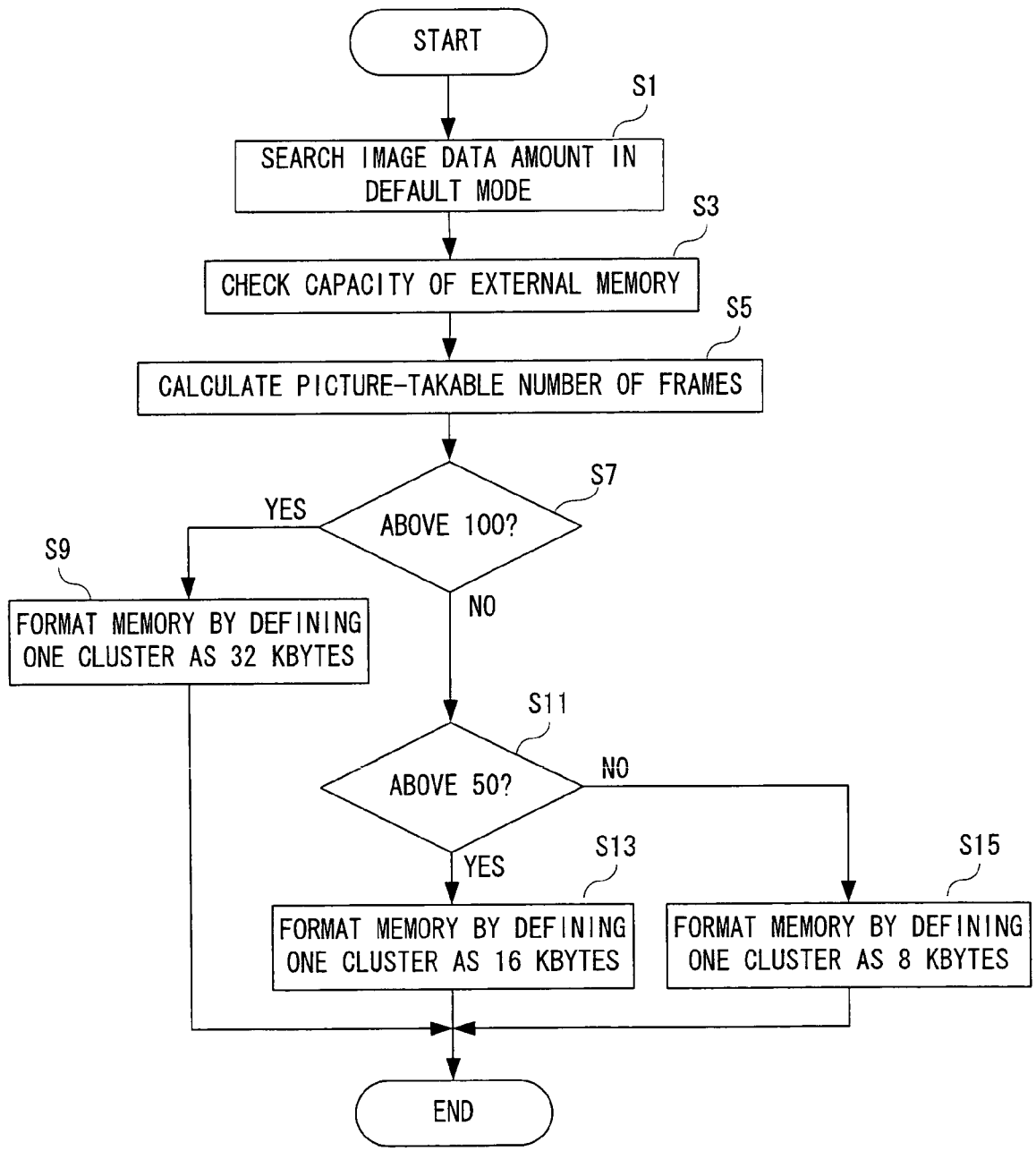
FIG. 2 is a flowchart showing a format processing of a CPU shown in FIG. 1 embodiment.

When a format processing according to the FAT system is instructed to be executed, the CPU 38 determines a cluster size according to a flowchart shown in FIG. 2. First, in a step S1, a size of the still image file corresponding to a default mode is specified. In this embodiment, the first resolution and the third compression ratio are respectively a resolution and a compression ratio at the default, and whereby, the third file size is specified as a file size at the default. A recording capacity of an external memory, that is, the recording medium 38 is detected in a step S3, and the recordable number of frames is calculated in a step S5. More specifically, the recordable number of frames is calculated by dividing the capacity of the recording medium 38 by the third file size. Succeedingly, the recordable number of frames is determined in steps S7 and step S11.

If the recordable number of frames is more than, or at least equal to (i.e., equal to or more than), "100", the process proceeds from the step S7 to the step S9 so as to format the recording medium 38 by defining a size of one cluster as 32 Kbytes. Furthermore if the recordable number of frames is more than, or at least equal to (i.e., equal to or more than), "50" and less than "100", the process proceeds from the step S11 to a step S13 so as to format the recording medium 38 by defining the size of one cluster as 16 Kbytes. In addition, if the recordable number of frames is less than "50", the process proceeds from the step S11 to a step S15 so as to format the recording medium 38 by defining the size of one cluster as 8 Kbytes. After completion of the format, the process is ended.

According to this embodiment, since the cluster size is determined on the basis of the recordable number of frames calculated by the file size and the capacity of the recording medium, it is possible to manage to shorten a time required to record and prevent the efficiency in the use of the recording medium 38 from being reduced at the same time.

Figure 3:
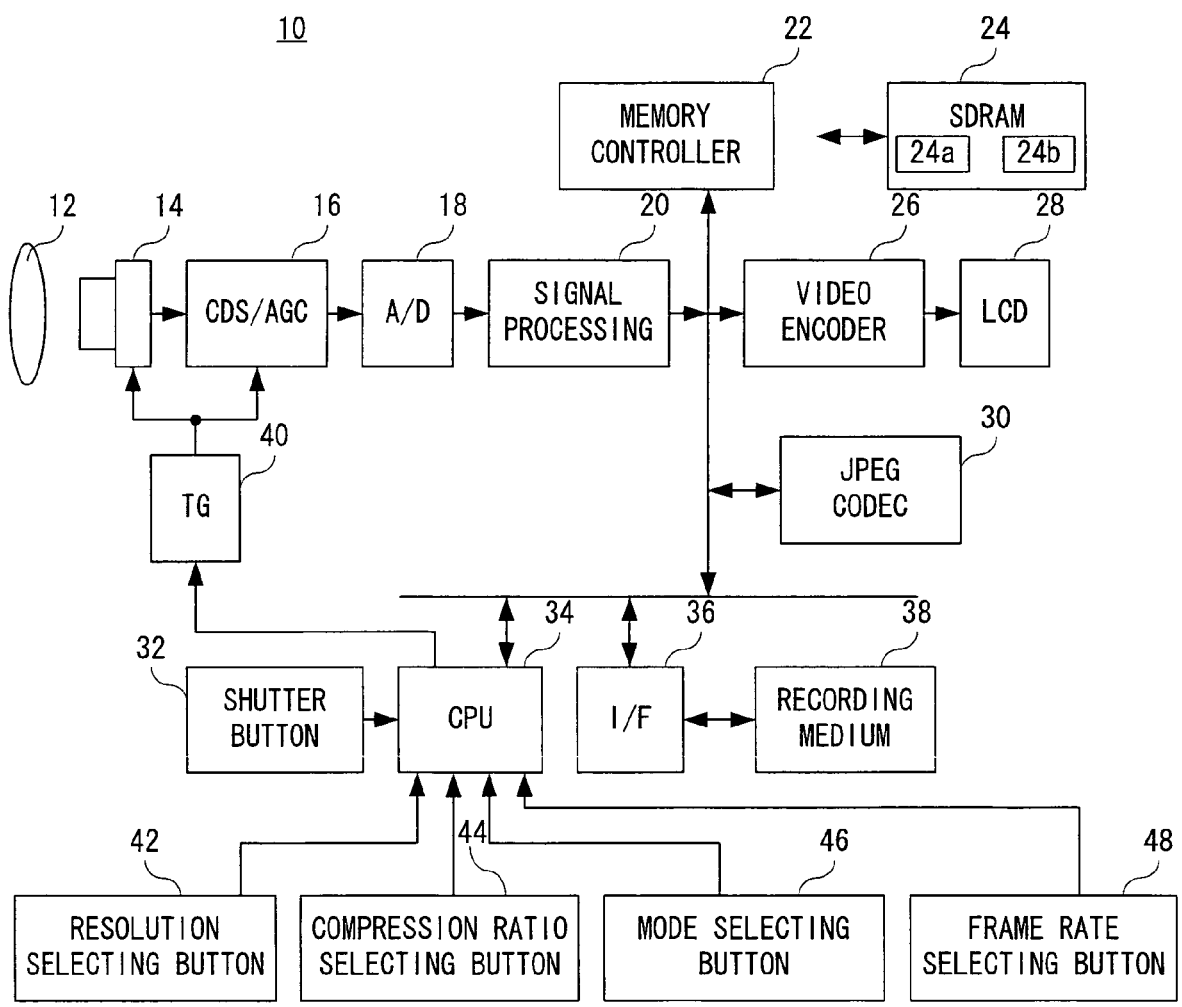
FIG. 3 is an illustrative view showing another embodiment of the present invention.

A digital camera 10 of another embodiment shown in FIG. 3 is the same as the above-described embodiment except that two modes such as a still image shooting mode and a motion image shooting mode are provided. Therefore, a duplicated description is omitted.

It is noted that the still image shooting mode is, as described above, a mode for recording a still image of the object every time that the shutter button 32 is depressed. The motion image shooting mode is a mode for recording a motion image of the object during a period successive to the depression of the shutter button 32.

Referring to FIG. 3, the digital camera 10 of the other embodiment is further provided with a mode switching button 46 for switching the shooting mode between the still image shooting mode and the motion image shooting mode. When the still image shooting mode is selected by the mode switching button 46, a still image of the object is imaged according to the above-described operation.

On the other hand, when the shutter button 32 is operated in a state that the motion image shooting mode is selected by the mode switching button, the CPU 34 instructs the TG 40 to repeat a main exposure and a thin-out reading at a predetermined resolution. The TG 40 applies a timing signal corresponding to the instruction to the image sensor 14. Thus, a raw image signal at the predetermined resolution is output from the image sensor 14 every one frame period.

Each frame of the raw image signal output from the image sensor 14 is input to the A/D converter 18 through a processing in the CDS/AGC circuit 16 so as to be converted into raw image data. The converted raw image data is subjected to the above-described processing in the signal processing circuit 20, and each frame of YUV data output from the signal processing circuit 20 is written to a YUV data area 24a of the SDRAM 24 by the memory controller 22.

The JPEG codec 30 reads, when a compression instruction is applied from the CPU 34, the YUV data from the YUV data area 24a, subjects the read YUV data to a JPEG compression, and writes generated JPEG data to a JPEG data area 24b of the SDRAM 24.

Such the compression process is continued until the shutter button 32 is once again operated. That is, the compression processing is repeated during a period from the first operation of the shutter button 32 to the next operation of the shutter button 32, and a plurality of frames of JPEG data are accumulated in the JPEG data area 24b. The accumulated JPEG data is read by the memory controller 22 and recorded on the recording medium 38 via the I/F 36. Thus, a movie file (Quick Time file) including the plurality of frames of JPEG data is created in the recording medium 38.

When the reproducing mode is selected, the still image file or the movie file recorded on the recording medium is reproduced. When the still image file is selected, the still image is displayed on the LCD 28 as described above. When the movie file is selected, each frame of JPEG data stored in the movie file is periodically subjected to the same process as in the still image reproduction. Thus, a motion image is displayed on the LCD 28.

Furthermore, in the motion image shooting mode, a frame rate of the image sensor 14 can be arbitrarily set. That is, it is possible to select any one of a first fame rate (=15 fps) and a second frame rate (=30 fps) by operating a frame rate selecting button 48.

In addition, in the motion image shooting mode, it is possible to select a third resolution (=horizontal 640 pixels× vertical 480 pixels), a fourth resolution (=horizontal 320 pixels×vertical 240 pixels), or a fifth resolution (=horizontal 160 pixels ×vertical 120 pixels), and it is possible to select a seventh compression ratio (=10.8) or a eighth compression ratio (=20.4) for each resolution.

For example, in a case that the 30 fps and the third resolution are selected, the motion image is recorded for 42 seconds into the recording medium 38 of 64 Mbytes. In the motion image recording, a recording bit rate has to be considered. In this embodiment, the recording bit rate is 12.19 Mbps (=64 Mbytes/42 seconds×8 bytes). Then, in a case that the 15 fps and the third resolution are selected, a recordable time period is extended into twice. Furthermore, in a case that the 30 fps and the fourth resolution are selected, the recordable time period is extended into four times.

In this embodiment, a condition where the motion image recording is performed at the 30 fps and at the third resolution is the strictest, and in this condition, a high-speed accessibility is imposed on the recording medium 38. That is, in a case of having a motion image imaging function, the cluster size has to be determined in consideration of the recording bit rate.

In a case that the recordable number of frames is more than the first threshold value, defining the size of one cluster as 64 Kbytes (the fourth size), the recording medium 38 is formatted. Furthermore, in a case that the recordable number of frames is less than the first threshold value and equal to or more than the second threshold value, defining the size of one cluster as the first size, the recording medium 38 is formatted. Thus, it is possible to speed up a recording speed.

Figure 4:
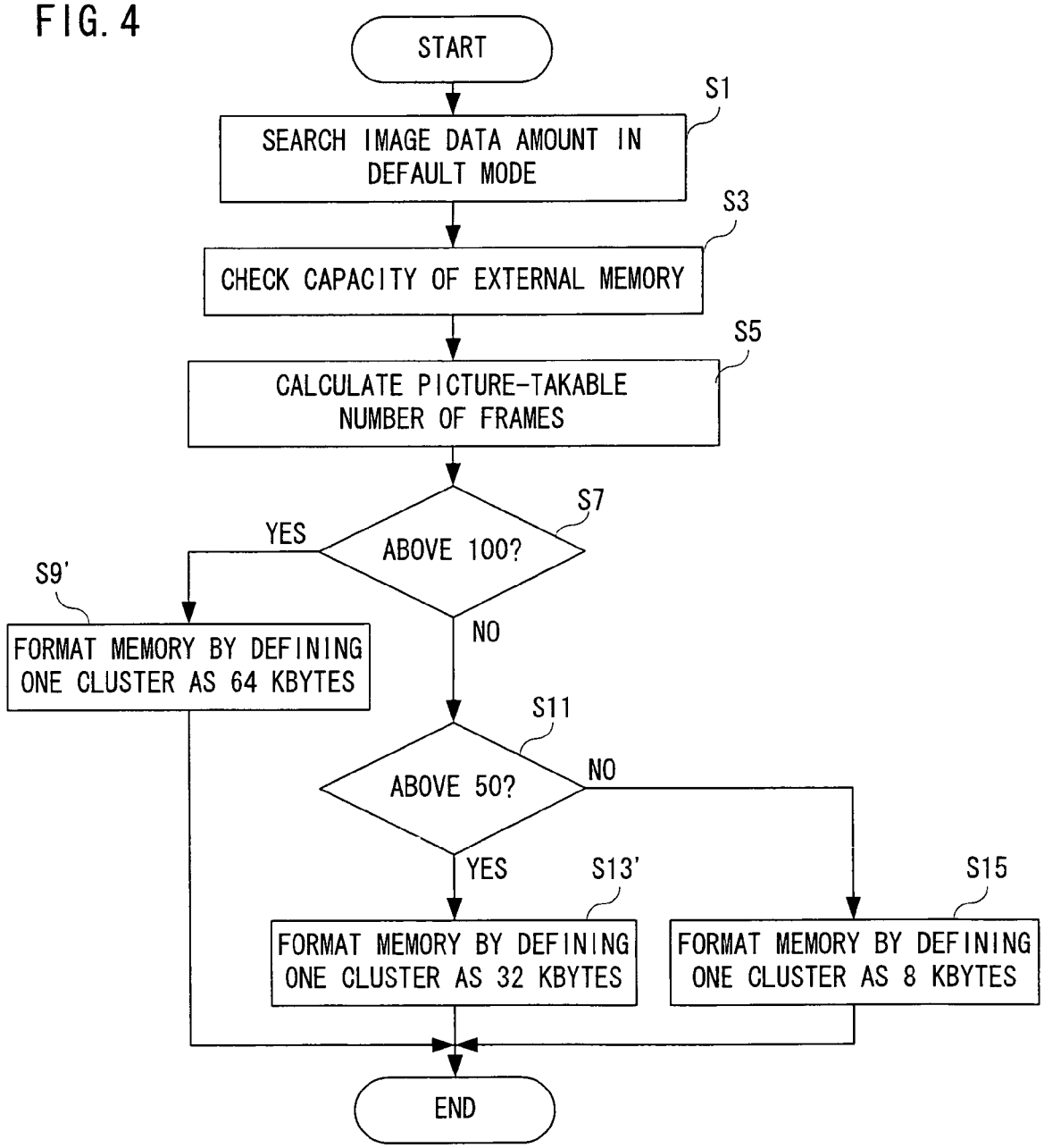
FIG. 4 is a flowchart showing a format processing of a CPU shown in FIG. 3 embodiment.

The CPU 34 specifically executes a process according to flowchart shown in FIG. 4. It is noted that since the processing shown in FIG. 4 is approximately the same as the processing shown in FIG. 2, a description is only made on a different part.

Referring to FIG. 4, if "YES" in the step S7, that is, if the picture-takable number of frames is more than, or at least equal to (i.e., equal to or more than), 100, the recording medium 38 is formatted by defining the size of one cluster as 64 Kbytes (the fourth size) in a step S9'. Furthermore, if "YES" in the step S11, that is, if the picture-takable number of frames is more than, or at least equal to (i.e., equal to or more than), 50 and less than 100 the recording medium 38 is formatted by defining the size of one cluster as 32 Kbytes (first size) in a step S13'. In the steps S9' and S13', the writing speed in the motion image shooting mode is considered as the most important. It is noted that if the picture-takable number of frames is less than 50, a format is performed by defining the size of one cluster as the third size in consideration of the efficiency in the use of the recording medium 38 as the most important in a step S15.

According to this embodiment, in a case that the digital camera 10 has the motion image imaging function, the cluster size is determined in consideration of the recording bit rate of the motion image. Thus, it is possible to manage to speed up a recording speed of the motion image or the still image, and prevent the efficiency in the use of the recording medium 38 from being reduced at the same time.

Figure 5:
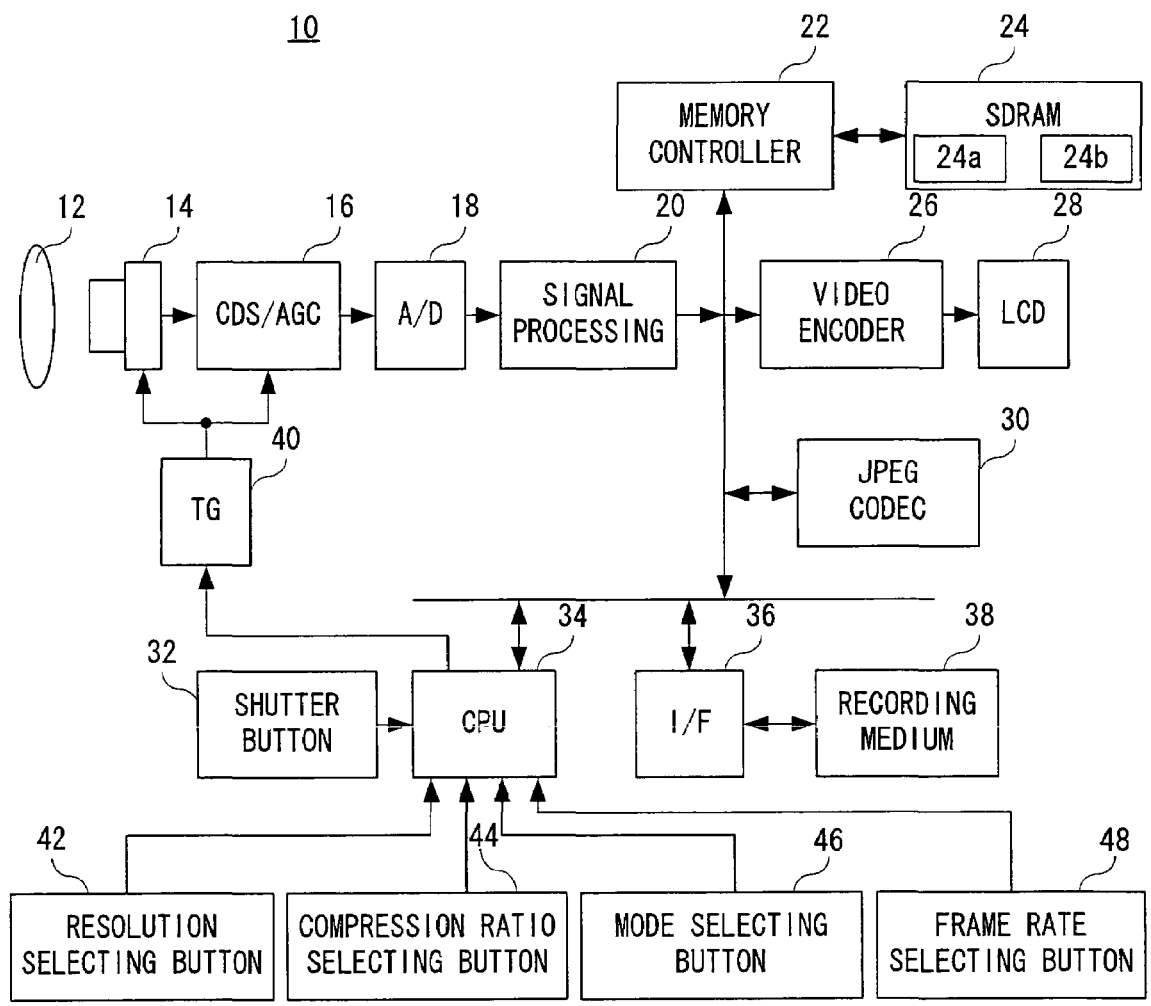
FIG. 5 is a block diagram showing the other embodiment of the present invention.
Figure 6:
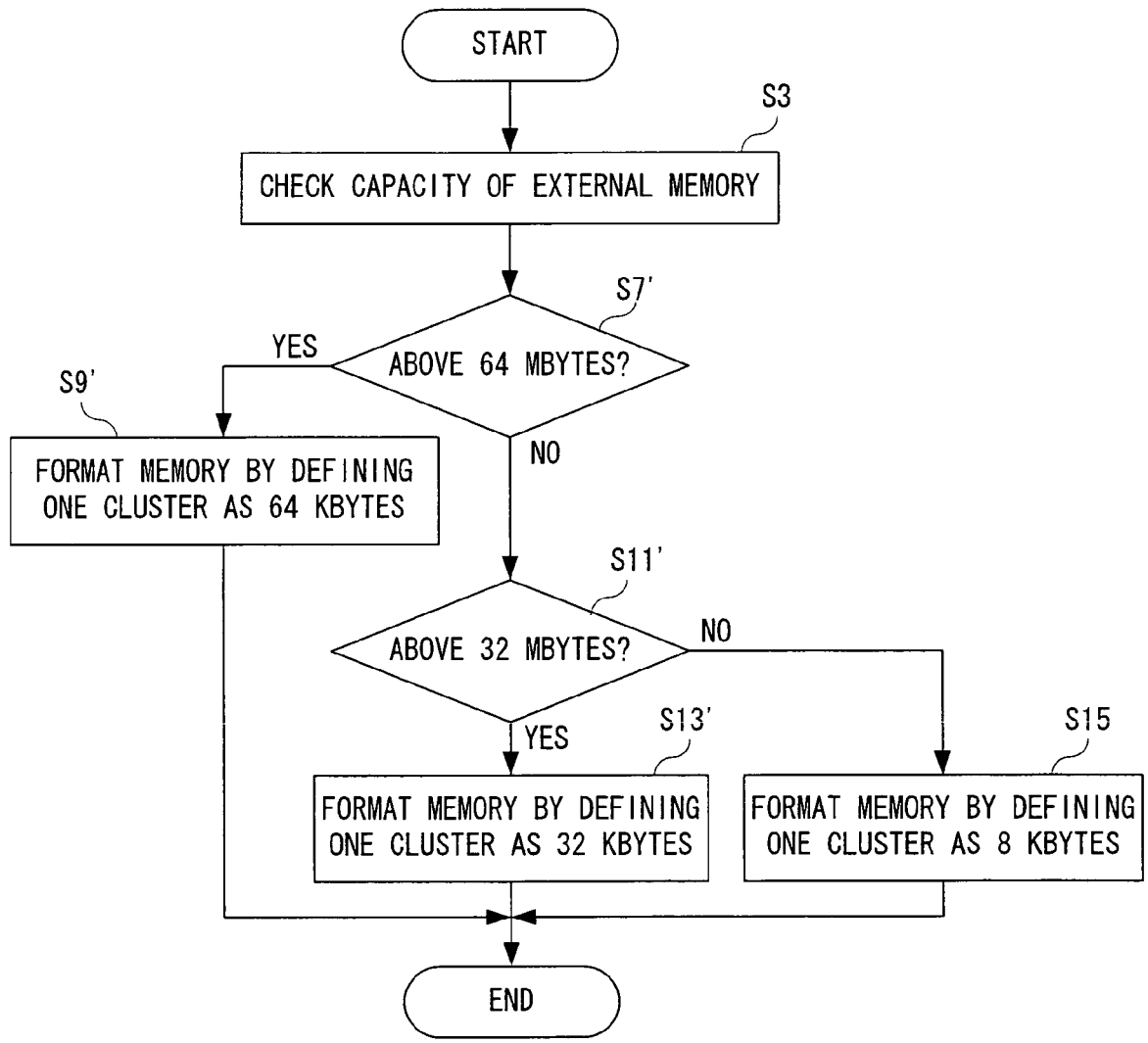
FIG. 6 is a flowchart showing a format processing of the CPU that is applied to FIG. 3 embodiment.

The digital camera 10 of another embodiment shown in FIG. 5 is the same as FIG. 3 embodiment except that the CPU 34 executes a processing according to a flowchart shown in FIG. 6, and therefore, a duplicated description is omitted.

Referring to FIG. 6, the recording capacity of the recording medium 38 is detected in the step S3, and the detected recording capacity is determined in the steps S7' and S11'. If the recording capacity is more than, or at least equal to (i.e., equal to or more than), 64 Mbytes, the process proceeds from the step S7' to the step S9' so as to format the recording medium 38 by defining the size of one cluster as 64 Kbytes. Furthermore, if the recording capacity is more than, or at least equal to (i.e., equal to or more than), 32 Mbytes and less than 64 Mbytes, the process proceeds from the step S11' to the step S13' so as to format the recording medium 38 by defining the size of one cluster as 32 Kbytes. Furthermore, if the recording capacity is less than 32 Mbytes, the process proceeds from the step S11' to the step S15 so as to format the recording medium 38 by defining the size of one cluster as 8 Kbytes. After completion of the format, the process is ended.

According to this embodiment, since the cluster size is determined on the basis of the capacity of the recording medium, there is no need to detect the file size and calculate the recordable number of frames, and this makes it possible to realize reduction of a time required to record and prevention of reduction in the efficiency in the use of the recording medium 38 with a simple method. This embodiment also pays attention to the fact that if the recording medium 38 has a large capacity, the reduction in the efficiency in the use of the clusters becomes insignificant.

It is noted that although the recordable number of frames is calculated on the basis of the file size at the default in the above-described embodiment, the file size utilized for the calculation may arbitrarily be selected according to preferences of the user. The processing according to the flowchart shown in FIG. 6 may be applied to FIG. 1 embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus that records image data on a recording medium in which a recording area is divided into a plurality of unit areas and available unit areas can be dispersedly distributed, comprising:
   a detector for detecting a capacity of said recording medium; and
   a setter for setting each of said unit areas to a first unit area size when the capacity detected by said detector is one of at least equal to and greater than a first recording medium capacity size, and for setting each of said unit areas to a second unit area size when the capacity detected by said detector is less than the first recording medium capacity size, the first unit area size being greater than the second unit area size.

2. An image recording apparatus according to claim 1, further comprising a specifier for specifying a recordable number of frames of said recording medium on the basis of the capacity detected by said detector, wherein said setter sets the size of said unit area on the basis of the recordable number of frames specified by said specifier.

3. An image recording apparatus according to claim 2, wherein said image data is compressed image data compressed by rendering a predetermined size a target, and said specifier specifies said recordable number of frames on the basis of the capacity of said recording area and said target size.

4. A digital camera provided with the image recording apparatus according to claim 3.

5. A digital camera provided with the image recording apparatus according to claim 2.

6. An image recording apparatus according to claim 1, wherein said image data is motion image data formed by a plurality of screens of still images, and said setter sets the size of said unit area in consideration of a bit rate of the motion image data.

7. A digital camera provided with the image recording apparatus according to claim 6.

8. A digital camera provided with the image recording apparatus according to claim 1.

9. An image recording apparatus according to claim 1, wherein the first unit area size is about twice greater than the second unit area size.

10. An image recording apparatus according to claim 1, wherein the setter sets each of said unit areas to the second unit area size when the capacity detected by said detector is less than the first recording medium capacity size and is one of at least equal to and greater than a second recording medium capacity size, and wherein the setter sets each of said unit areas to a third unit area size when the capacity detected by said detector is less than the second recording medium capacity size, the second unit area size being greater than the third unit area size, and the first recording medium capacity size being greater than the second recording medium capacity size.

11. An image recording apparatus according to claim 10, wherein the first unit area size is about twice greater than the second unit area size, and wherein the second unit area size is about four times greater than the third unit area size.

12. An image recording apparatus according to claim 10, wherein the first recording medium capacity size is about twice greater than the second recording medium capacity size.

13. An image recording method that records image data on a recording medium in which a recording area is divided into a plurality of unit areas and available unit areas can be dispersedly distributed, comprising the steps of:
   (a) detecting a capacity of said recording medium; and
   (b) setting each of said unit areas to a first unit area size when the capacity detected in said step (a) is one of at least equal to and greater than a first recording medium capacity size; and
   (c) setting each of said unit areas to a second unit area size when the capacity detected in said step (a) is less than the first recording medium capacity size, the first unit area size being greater than the second unit area size.

14. An image recording method according to claim 13, wherein the first unit area size is about twice greater than the second unit area size.

15. An image recording method according to claim 13, wherein said step (c) includes the sub-step of:

(c1) setting each of said unit areas to the second unit area size when the capacity detected in said step (a) is less than the first recording medium capacity size and is one of at least equal to and greater than a second recording medium capacity size;

and wherein the image recording method further comprises the step of:

(d) setting each of said unit areas to a third unit area size when the capacity detected in said step (a) is less than the second recording medium capacity size, the second unit area size being greater than the third unit area size, and the first recording medium capacity size being greater than the second recording medium capacity size.

16. An image recording method according to claim 15, wherein the first unit area size is about twice greater than the second unit area size, and wherein the second unit area size is about four times greater than the third unit area size.

17. An image recording method according to claim 15, wherein the first recording medium capacity size is about twice greater than the second recording medium capacity size.

18. An image recording method that records image data on a recording medium in which a recording area is divided into a plurality of unit areas and available unit areas can be dispersedly distributed, comprising the steps of:

(a) detecting the capacity of said recording medium;

(b) calculating a recordable number of frames of said recording medium on the basis of the capacity detected in said step (a);

(c) setting each of said unit areas to a first unit area size when the recordable number of frames calculated in said step (b) is one of at least equal to and greater than a first threshold number of recordable frames;

(d) setting each of said unit areas to a second unit area size when the recordable number of frames calculated in said step (b) is less than the first threshold number of recordable frames and is one of at least equal to and greater than a second threshold number of recordable frames; and (e) setting each of said unit areas to a third unit area size when the recordable number of frames calculated in said step (b) is less than the second threshold number of recordable frames, the first unit area size being greater than the second unit area size, and the second unit area size being greater than the third unit area size, the first threshold number of recordable frames being greater than the second threshold number of recordable frames.

* * * * *